(12) United States Patent
Tada et al.

(10) Patent No.: US 6,384,955 B2
(45) Date of Patent: May 7, 2002

(54) LIGHT MODULATOR

(75) Inventors: Hitoshi Tada; Tomoko Kadowaki, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/839,120

(22) Filed: Apr. 23, 2001

Related U.S. Application Data

(63) Continuation of application No. 09/245,838, filed on Feb. 8, 1999, now Pat. No. 6,282,009.

(30) Foreign Application Priority Data

Aug. 7, 1998 (JP) .......................................... 10-224241

(51) Int. Cl.⁷ .............................. G02F 1/03; G02B 6/12; H01L 21/00
(52) U.S. Cl. .......................... 359/248; 359/248; 385/14; 385/129; 438/39
(58) Field of Search .......................... 385/14, 129, 132; 359/248; 438/39, 31

(56) References Cited

U.S. PATENT DOCUMENTS

| | | | | |
|---|---|---|---|---|
| 5,455,433 A | * | 10/1995 | Komatsu | 257/95 |
| 5,901,265 A | | 5/1999 | Tohyama et al. | 385/131 |
| 5,920,419 A | | 7/1999 | Starck et al. | 359/248 |
| 6,134,368 A | * | 10/2000 | Sakata | 385/131 |
| 6,282,009 B1 | * | 8/2001 | Toda et al. | 359/248 |

FOREIGN PATENT DOCUMENTS

JP       8-316579       11/1996

OTHER PUBLICATIONS

Aoki et al., "InGaAs/InGaAsP MQW Electroabsorption Modulator Integrated With A DFB Laser Fabricated By Band–Gap Energy Control Selective Area MOCVD", IEEE Journal of Quantum Electronics, vol. 29, No. 6, Jun. 1993, pp. 2088–2096.

Ido et al., "Ultra–High–Speed Multiple–Quantum–Well Electro–Absorption Optical Modulators With Integrated Waveguides", Journal of Lightwave Technology, vol. 14, No. 9, Sep. 1996, pp. 2026–2034.

Lesterlin et al., "760km Transmission Over Standard Dispersion Fiber At 10 Gbit/s Using A High–Power Integrated Laser Modulator And A PIN Receiver Without Any Optical Amplifier", OFC '97 Technical Digest, Feb. 1997, pp. 199–200.

\* cited by examiner

*Primary Examiner*—Georgia Epps
*Assistant Examiner*—Timothy J Thompson
(74) *Attorney, Agent, or Firm*—Leydig, Voit & Mayer, Ltd.

(57) ABSTRACT

A light modulator includes a semiconductor substrate having a main surface, a rear surface, and a grounding conductor on the rear surface. A wave guide section having a width is located on the semiconductor substrate. A bonding pad section on the semiconductor substrate is located adjacent to the wave guide section and an insulating layer covers the main surface of the semiconductor substrate. A portion of the insulating layer immediately opposite the bonding pad section includes a multiple layer structure of insulating films. An electrode opposite the bonding pad section is electrically connected to the wave guide section.

11 Claims, 9 Drawing Sheets

LIGHT MODULATOR

This application is a continuation of U.S. application Ser. No. 09/245,838, filed Feb. 8, 1999, now U.S. Pat. No. 6,282,009.

BACKGROUND OF THE INVENTION

1. Field of the Invention

The present invention generally relates to a light modulator for modulating a laser beam and, more particularly, to a high speed light modulator of a kind used in a high speed optical fiber communication system. The present invention also relates to a method of manufacturing such light modulator.

2. Description of the Prior Art

In the high speed optical fiber communication system, a considerable amount of data are transmitted by the use of semiconductor laser beams and optical fibers. In order to cope with this feature, the semiconductor laser beams are required to be modulated at a high speed. With the conventional direct modulation system in which the electric current injected to a single-mode semiconductor laser is modulated to provide the modulated output laser beam, change in wavelength resulting from change in density of injected carriers (i.e., wavelength chirping) is so substantial that the conventional direct modulation system cannot be used in high-speed modulation of 10 Gbps or higher.

In view of the foregoing, as an alternative to the direct modulation system, the external modulation system has come to be the cynosure of those concerned, in which a light modulator having a low chirping and disposed externally of a semiconductor laser is utilized to modulate the laser beam while the current injected to the semiconductor laser is fixed. The combined modulator and laser assembly in which a light modulator, a single-mode semiconductor laser and an isolator separating the light modulator and the semiconductor laser from each other are integrated together on a single chip is shown by 60 in FIG. 7. Since no circuit is required between the modulator and the laser, the combined modulator and laser assembly 60 shown therein has a high practical utility and is extremely important as a key device for optical fiber communication of a large amount of data.

The light modulator will now be described. As shown in FIG. 8A, the light modulator 70 includes an InP semiconductor substrate 52 on which a semiconductor mesa layer 56 of a predetermined width containing a light absorption layer 51 and a semiconductor bonding pad layer 55 are formed. The laser beam inputted to the light modulator 70 is modulated by the light absorption layer 51. More specifically, by applying a voltage to the bonding pad electrode 55a, an electric field is applied from an electrode 54, covering the semiconductor mesa layer 56, to the light absorbing layer 51, and by shifting the absorption wavelength of the light absorbing layer 51, the input laser beam is modulated.

As shown in FIG. 8B, a groove 57 is formed between the semiconductor mesa layer 56 and the semiconductor bonding pad layer 55 for separating the semiconductor layers 55 and 56 from other semiconductor layers. The semiconductor mesa layer 56, the semiconductor bonding pad layer 55 and the groove 57 has their respective surfaces covered by a continuous insulating film 53. The bonding pad electrode 55a and the electrode 54 are formed by a metallic film continuously covering the insulating film 53 while the electrode 54 is held in ohmic contact with the semiconductor mesa layer 56 through an opening defined in the insulating film 53.

The conventional method of manufacturing the conventional light modulator is shown in FIGS. 9A to 9C. Referring first to FIG. 9A, a predetermined crystalline layer is epitaxially grown on the InP substrate 52 to form the semiconductor mesa layer 56 of the predetermined width including the light absorption layer 51, the groove 57 and the semiconductor bonding pad layer 55. Then, as shown in FIG. 9B, the insulating film 53 of $SiO_2$ having a film thickness of about 4000 Å is formed so as to cover the entire surface of the InP substrate 52. After a window for the ohmic contact has been formed in an upper surface of the semiconductor mesa layer 54 including the light absorption layer 51, the metallic film is formed at a predetermined location as shown in FIG. 9C to complete the bonding pad electrode 55a and the electrode 54.

In order for the light modulator to be used for high-speed modulation, it is necessary to reduce the static capacitance (hereinafter referred to as a "parasitic static capacitance") formed between surface electrodes (the bonding pad electrode 55a and the electrode 54) and a rear surface electrode. The parasitic static capacitance of the light modulator is expressed by the sum of the parasitic static capacitance of the mesa layer 56 plus the parasitic static capacitance of the bonding pad layer 55. In order to reduce the parasitic static capacitance of the light modulator, attempts have currently been made to minimize the surface area of each of the mesa layer 54 and the bonding pad layer 55 by forming the groove 57 therebetween.

It has, however, been found that considering the chirping of light that is propagated by the light absorption layer 51, the width of the mesa layer 56 can only be reduced to a certain limited dimension. Also, considering the bonding surface area of the bonding wire, the size of the bonding pad layer 55 is limited to about 50×50 $\mu$m. Thus, the approach to reduce the surface area of the mesa layer 56 and the bonding pad layer 55 in an attempt to reduce the parasitic static capacitance is limited and, therefore, a sufficiently high-speed modulation characteristic has been difficult to accomplish.

SUMMARY OF THE INVENTION

The present invention has therefore been developed in view of the foregoing problems and is intended to provide an improved light modulator capable of accomplishing a high-speed light modulation in which the parasitic static capacitance is reduced and also to provide an improved method of manufacturing such light modulator.

The light modulator of the present invention is such that the parasitic static capacitance of the bonding pad section has been reduced to substantially eliminate the above discussed problems, and is therefore effective to achieve the high-speed modulation. More specifically, the light modulator of the present invention includes a semiconductor substrate having first and second surfaces opposite to each other with a grounding conductor formed on the second surface thereof. A mesa section of a predetermined width laminated with a semiconductor layer including a light absorption layer and a bonding pad forming section adjacent the mesa section are formed on the semiconductor substrate. An insulating layer continuing from the mesa section to the bonding pad section is formed with an opening defined in a portion of the insulating film above the mesa section, and an electrode contacting an upper surface of the mesa section through the opening and extending to the bonding pad forming section is formed over the insulating layer. Accordance with the present invention, the light modulator is featured in that a portion of the insulating layer the bonding pad forming section has a thickness greater than that of the remaining portion of the insulating layer to reduce the parasitic static capacitance of the bonding pad section.

The portion of the insulating layer immediately above the bonding pad forming section comprises a multi layered structure containing at least insulating films laminated one above other. The remaining portion of the insulating layer comprises a single or multi layered structure containing a insulating films, in which a number of the insulating film is less than that of the bonding pad forming section.

The insulating films are two insulating films, one of the two insulating films is made of $SiO_2$ and the other is made of SiN.

The upper-layer insulating film of remaining portion of the insulating layer is same as the 2nd upper-layer insulating film of the bonding pad forming section.

The first method of manufacturing the light modulator according to the present invention is such that the parasitic static capacitance of the bonding pad section has been reduced to substantially eliminate the above discussed problems. More specifically, this first method is utilized to manufacture the light modulator which includes a semiconductor substrate having first and second surfaces opposite to each other with a grounding conductor formed on the second surface thereof, which substrate is formed with a mesa section of a predetermined width, laminated with a semiconductor layer including a light absorption layer, and a bonding pad forming section adjacent the mesa section, an insulating layer continuing from the mesa section to the bonding pad section and formed with an opening defined in a portion of the insulating layer above the mesa section, and a one-piece electrode formed over the insulating film and contacting an upper surface of the mesa section through the opening, the one-piece electrode forming a bonding pad electrode. This first method is featured in that it comprises forming a primary insulating film continuing from the mesa section to the bonding pad forming section, forming a mask so as to cover a portion of the primary insulating film formed above the bonding pad forming section, etching the primary insulating film to remove another portion of the primary insulating film other than that portion of the primary insulating film above the bonding pad forming section, removing the mask forming a secondary insulating film continuing from that portion of the primary insulating film above the bonding pad forming section and the mesa section and completing the insulating whereby that portion of the insulating layer above the bonding pad forming section has a thickness greater than that of the remaining portion of the insulating layer to reduce the parasitic static capacitance of the bonding pad section.

The second method of manufacturing the light modulator according to the present invention is such that the parasitic static capacitance of the bonding pad section has been reduced to substantially eliminate the above discussed problems. More specifically, this second method is utilized to manufacture the light modulator which includes a semiconductor substrate having first and second surfaces opposite to each other with a grounding conductor formed on the second surface thereof, which substrate is formed with a mesa section of a predetermined width, laminated with a semiconductor layer including a light absorption layer, and a bonding pad forming section adjacent the mesa section, an insulating layer continuing from the mesa section to the bonding pad section and formed with an opening defined in a portion of the insulating layer above the mesa section, and a one-piece electrode formed over the insulating film and contacting an upper surface of the mesa section through the opening, the one-piece electrode forming a bonding pad electrode. This second method is featured in that it comprises forming a primary insulating film continuing from the mesa section to the bonding pad forming section, forming a mask so as to cover a portion of the primary insulating film other than a portion of the primary insulating film that is formed above the bonding pad forming section, forming a secondary insulating film over the mask and that portion of the primary insulating film above the bonding pad forming section, removing the mask to allow that portion of the secondary insulating film above the bonding pad section to continue to that portion of the primary insulating film above the mesa section to thereby complete the insulating layer so that that portion of the insulating layer above the bonding pad forming section has a thickness greater than that of the remaining portion of the insulating layer to reduce the parasitic static capacitance of the bonding pad section.

The third method of manufacturing the light modulator according to the present invention is such that the parasitic static capacitance of the bonding pad section has been reduced to substantially eliminate the above discussed problems. More specifically, this third method is utilized to manufacture the light modulator which includes a semiconductor substrate having first and second surfaces opposite to each other with a grounding conductor formed on the second surface thereof, which substrate is formed with a mesa section of a predetermined width, laminated with a semiconductor layer including a light absorption layer, and a bonding pad forming section adjacent the mesa section, an insulating layer continuing from the mesa section to the bonding pad section and formed with an opening defined in a portion of the insulating layer above the mesa section, and a one-piece electrode formed over the insulating layer and contacting an upper surface of the mesa section through the opening, the one-piece electrode forming a bonding pad electrode. This third method is featured in that it comprises a primary insulating film forming step of forming a primary insulating film continuing from the mesa section to the bonding pad forming section, forming a mask so as to cover a portion of the primary insulating film above the bonding pad forming section, etching another portion of the primary insulating film other than that portion of the primary insulating film above the bonding pad forming section to a predetermined thickness, removing the mask so as to leave the insulating film having a thick film portion above the bonding pad forming section and a thin film portion above the mesa section, the thick and thin film portion being continued together, and completing the insulating layer whereby that portion of the insulating layer above the bonding pad forming section has a thickness greater than the remaining portion of the insulating layer to thereby reduce the parasitic static capacitance of the bonding pad section.

The primary insulating film forming step of the third method of the present invention discussed above may include forming an under-layer insulating film continuing from the mesa section to the bonding pad forming section, forming over the under-layer insulating film an intermediate-layer insulating film of a material different from that of the under-layer insulating film, and forming over the intermediate-layer insulating film an upper-layer insulating film of the same material as that of the under-layer insulating film. In such case, the etching step may be carried out for selectively etching only a portion the upper-layer other than that formed above the bonding pad section, and completing the insulating layer.

Preferably, in any of the first to third method, the insulating film is made of SiO$_2$ or SiN.

In the practice of the third method, one of the primary insulating film and the secondary insulating film is preferably made of SiO$_2$ while the other thereof is preferably made of SiN.

Also, in the practice of any one of the first to third methods of the present invention, the insulating film is preferably formed by the use of a CVD technique, a sputtering technique or a vacuum evaporation technique.

DESCRIPTION OF THE EMBODIMENTS

First Embodiment

Figure 1A:
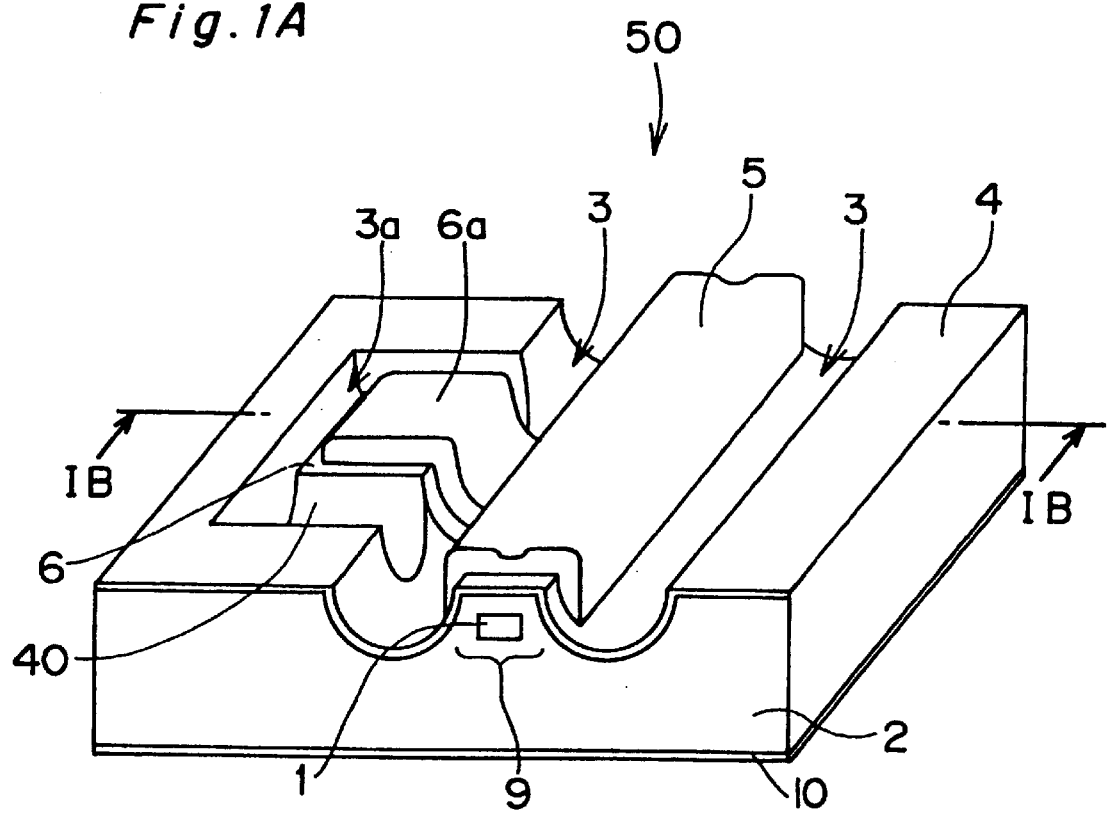
FIG. 1A is a fragmentary perspective view of a light modulator according to a first preferred embodiment of the present invention.

A light modulator according to a first embodiment of the present invention is shown by 50 in FIGS. 1A to 4D. Referring particularly to FIGS. 1A and 1B, the light modulator 50 includes a mesa section 9 and a bonding pad forming section 6 both protruding outwardly from an InP semiconductor substrate 2. More specifically, the mesa section 9 is delimited by and between a pair of parallel grooves 3 formed at a predetermined position in the semiconductor substrate 2. The bonding pad forming section 6 is positioned on one side of one of the grooves 3 opposite to the mesa section 9 and is delimited by such one of the grooves 3 and a generally U-shaped groove 3a defined in the semiconductor substrate 2. The mesa section 9 includes an electrode 5 formed thereon through a SiO$_2$ insulating layer 4 and has a light absorption layer 1 embedded therein, which layer 1 is operable to receive and transmit a laser beam therethrough. On the other hand, the bonding pad forming section 6 includes a bonding pad electrode 6a formed thereon through a SiO$_2$ insulating thick-layer 40 intervening between it and the bonding pad electrode 6a. The bonding pad electrode 6a and the electrode 5 form and are served respectively by different parts of a metallic layer. It is to be noted that the light modulator 50 has a rear surface formed with a rear surface electrode 10.

Figure 1B:
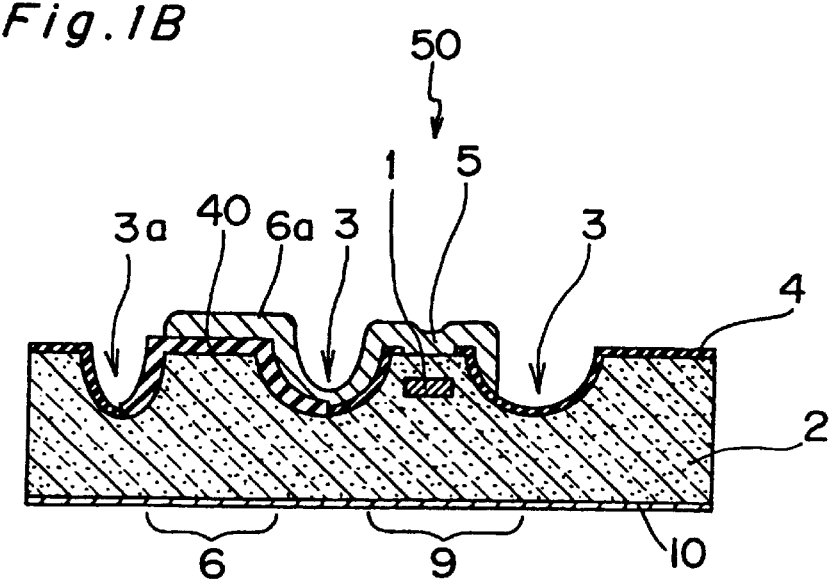
FIG. 1B is a cross-sectional view taken along the line IB—IB in FIG. 1A.

In the illustrated light modulator 50, the insulating layer 4 and the insulating thick-layer 40 are integral parts of a single insulating layer that are formed above the mesa section 9 and above the bonding pad forming section 6, respectively. However, as best shown in FIG. 1B, a portion of the insulating layer overlaying the bonding pad forming section 6, that is, the insulating thick-layer 40 has a thickness greater than the remaining portion of the insulating layer, for example, the insulating layer 4 overlaying the mesa section 9. In addition as discussed hereinabove, the insulating layer 4 and the insulating thick-layer 40 are covered by the metallic layer and a portion of the metallic layer immediately above the bonding pad forming section 6 serves as the bonding pad electrode 6a while another portion of the metallic layer immediately above the mesa section 9 serves the electrode 5. The electrode 5 is held in contact with an upper surface of the mesa section 9 through an opening defined in the insulating layer 4.

Since the insulating thick-layer 40 is formed only immediately below the bonding pad electrode 6a, the parasitic static capacitance between the bonding pad electrode 6a and the rear surface electrode 10 can be reduced. In detail, by increasing the thickness of thick-layer 40 around the bonding pad forming section 6 from 4000 Å to 8000 Å, the parasitic capacitance around the bonding pad forming section 6 is half of the parasitic capacitance around the mesa section 9, because the capacitance is inversely proportional to the thickness of the insulating layer. Also, since the insulating thick-layer 40 is formed on a relatively narrow portion of the bonding pad forming section 6, there is no possibility that the substrate 2 may warp. Furthermore, since that portion of the insulating layer overlaying the mesa section 9 has a relatively small thickness, as is the case with that in the conventional light modulator, there is no difficulty forming the opening in the insulating layer.

Figure 2A:
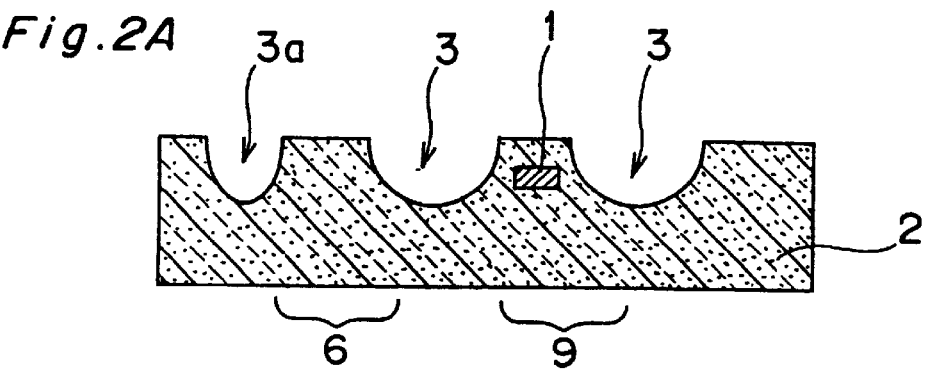
FIGS. 2A to 2D are respective views similar to FIG. 1B, showing a method of manufacture of the light modulator according to the first embodiment of the present invention.
Figure 2B:
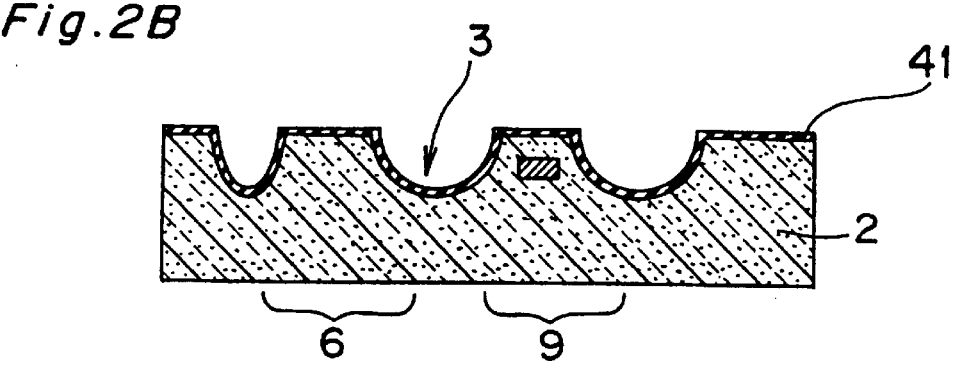
Figure 2C:
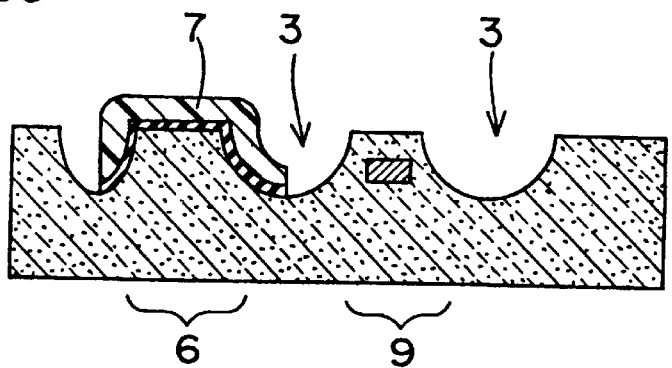
Figure 2D:
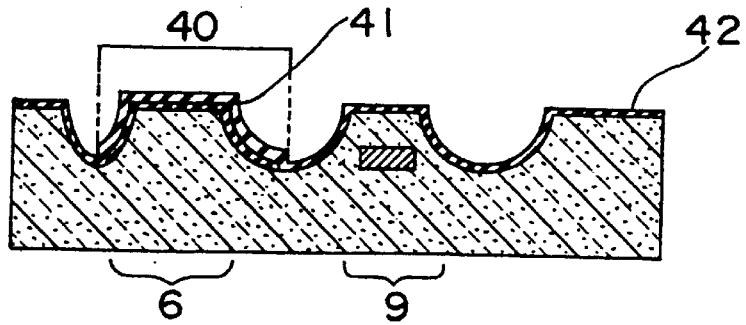

The method of manufacturing the light modulator 50 of the structure discussed above will now be described with particular reference to FIGS. 2A to 2D. At the outset, as shown in FIG. 2A, after a predetermined crystalline layer has been epitaxially grown on the InP semiconductor substrate 2, a pair of grooves 3 are formed at a predetermined location in the semiconductor substrate 2 so that the mesa section 9 of a predetermined width having the light absorption layer 1 can be eventually formed between these grooves 3. The generally U-shaped groove 3a continued to one of the grooves 3 is also formed to define the bonding pad forming section 6. Then, as shown in FIG. 2B, a SiO$_2$ insulating film 41 having a thickness of about 4000 Å is formed on the semiconductor substrate 2 so as to overlay the mesa section 9 and the bonding pad forming section 6 continuously. Thereafter, as shown in FIG. 2C, only a portion of the insulating film 41 overlaying the bonding pad forming section 6 is covered by a photo-resist 7 that is utilized as a mask, followed by removal of the remaining portion of the insulating film 41 other than that portion of the insulating film 41 overlaying the bonding pad forming section 6. After the subsequent removal of the photo-resist 7, as shown in FIG. 2D, another SiO$_2$ insulating film 42 having a thickness of about 4000 Å is again formed on the semiconductor substrate 2 so as to overlay the mesa section 9 and the bonding pad forming section 6 continuously. In this way, the bonding pad forming section 6 is covered by the insulating thick-layer 40 of a thickness of about 8000 Å, i.e., that portion of the insulating film 41 overlapped by the insulating film 42, while a portion other than the bonding pad forming section, for example, the mesa section 9 is covered only by the insulating film 42 of about 4000 Å.

Thus, the bonding pad electrode 6a and the electrode 2 are formed immediately above the bonding pad forming section 6 and the mesa section 2, respectively. More specifically, while the opening is formed in the portion of the insulating layer overlaying an upper surface of the mesa section and the metallic layer connected in part with the upper surface of the mesa section through the opening and in part overlaying the bonding pad forming section. The rear surface electrode 10 is formed in any known manner as shown in FIG. 1A, thereby completing the light modulator 50 of the present invention.

Since as discussed above the insulating thick-layer 40 is formed only immediately below the bonding pad electrode 6a, the parasitic static capacitance between the bonding pad electrode 6a and the rear surface electrode 10 can be reduced. Also, since the insulating thick-layer 40 is formed on that relatively narrow portion of the bonding pad forming section 6, there is no possibility that the substrate 2 may warp. Furthermore, since that portion of the insulating layer overlaying the mesa section 9 has a relatively small thickness as is the case with that in the conventional light modulator, there is no difficulty forming the opening in the insulating layer.

Figure 3A:
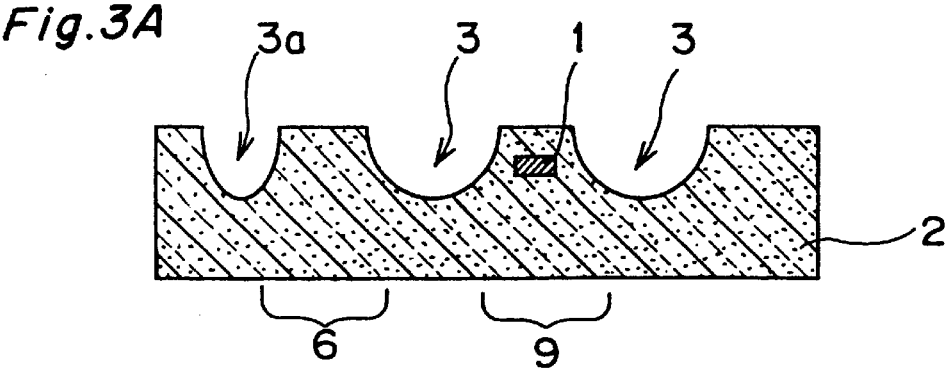
FIGS. 3A to 3D are respective views similar to FIG. 1B, showing the modified method of manufacture of the light modulator according to the first embodiment of the present invention.
Figure 3B:
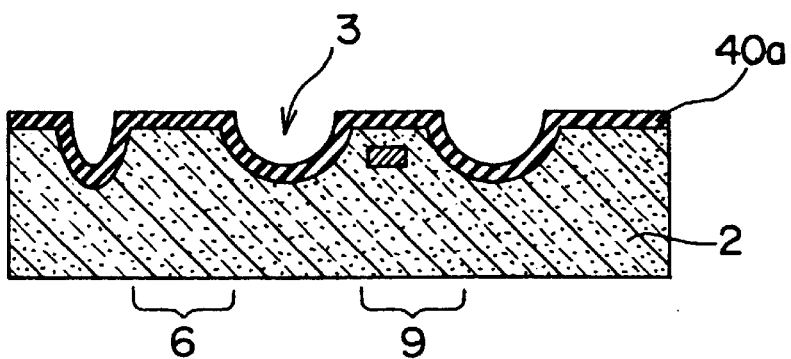
Figure 3C:
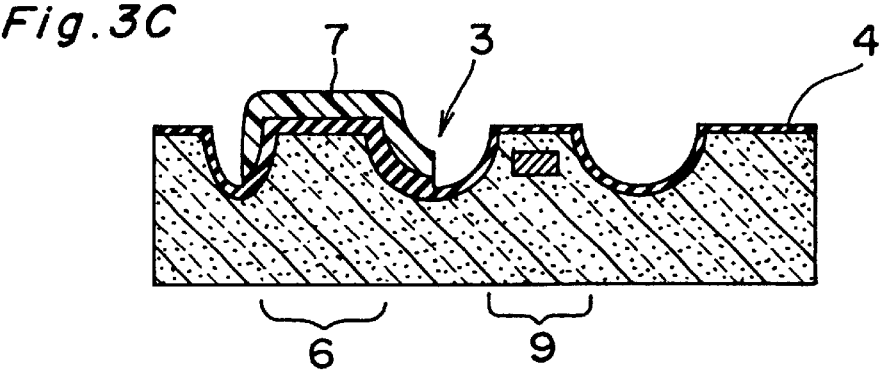
Figure 3D:
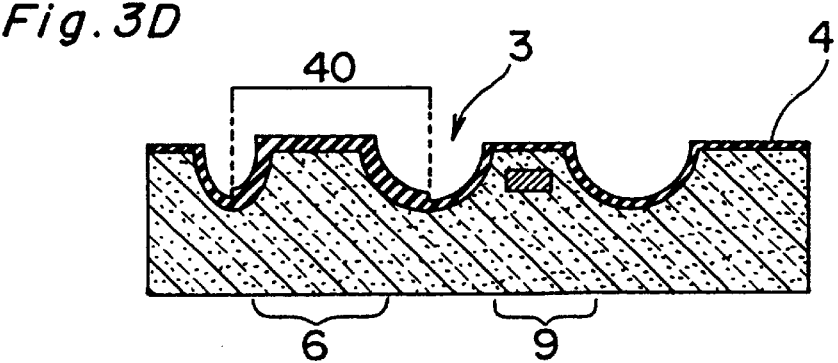

The light modulator 50 of the present invention can also be manufactured by an alternative method which will now be described with reference to FIGS. 3A to 3D. Referring to FIG. 3A, after a predetermined crystalline layer has been epitaxially grown on the InP semiconductor substrate 2, a pair of grooves 3 are formed at a predetermined location in the semiconductor substrate 2 so that the mesa section 9 of a predetermined width having the light absorption layer 1 can be eventually formed between these grooves 3. The generally U-shaped groove 3a continued to one of the grooves 3 is also formed to define the bonding pad forming section 6. Then, as shown in FIG. 3B, a SiO$_2$ insulating film 40a having a thickness of about 8000 Å is formed on the semiconductor substrate 2 so as to overlay the mesa section 9 and the bonding pad forming section 6 continuously. Thereafter, as shown in FIG. 3C, only a portion of the insulating film 41 overlaying the bonding pad forming section 6 is covered by a photo-resist 7 that is utilized as a mask, followed by etching of the remaining portion of the insulating film 40a other than that portion of the insulating film 40a overlaying the bonding pad forming section 6 to render that remaining portion of the insulating film 40a to have a film thickness of about 4000 Å. After the subsequent removal of the photo-resist 7, as shown in FIG. 3D, the insulating layer continuously covering the semiconductor surface including the bonding pad forming section 6 and the mesa section 9 can be obtained. A portion of the insulating layer overlying the bonding pad forming section 6 and its vicinity has a film thickness of about 8000 Å (the insulating thick-film 40) while the other portion of the insulating film, for example, a portion of the insulating film overlaying the mesa section has a thickness of about 4000 Å (the insulating film 4).

Thus, the bonding pad electrode 6a and the electrode 2 are formed immediately above the bonding pad forming section 6 and the mesa section 2, respectively. More specifically, while the opening is formed in the portion of the insulating layer overlaying an upper surface of the mesa section and the metallic layer connected in part with the upper surface of the mesa section through the opening and in part overlaying the bonding pad forming section. The rear surface electrode 10 is formed in any known manner as shown in FIG. 1A, thereby completing the light modulator 50 of the present invention.

Since as discussed above the insulating thick-layer 40 is formed only immediately below the bonding pad electrode 6a, the parasitic static capacitance between the bonding pad electrode 6a and the rear surface electrode 10 can be reduced. Also, since the insulating thick-film 40 is formed on that relatively narrow portion of the bonding pad forming section 6, there is no possibility that the substrate 2 may warp. Furthermore, since that portion of the insulating layer overlaying the mesa section 9 has a relatively small thickness as is the case with that in the conventional light modulator, there is no difficulty forming the opening in the insulating layer.

Figure 4A:
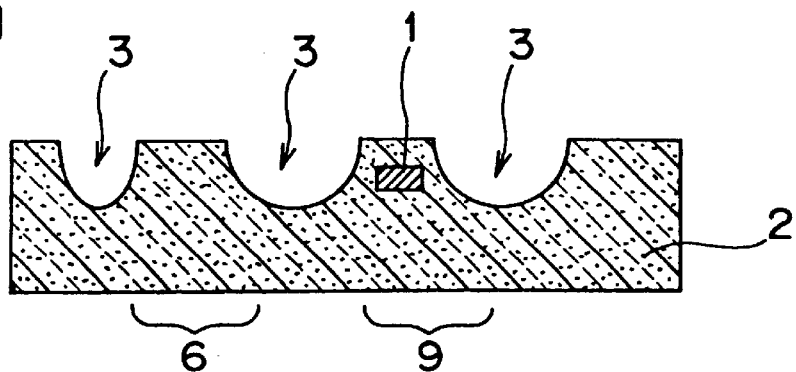
FIGS. 4A to 4D are respective views similar to FIG. 1B, showing the further modified method of manufacture of the light modulator according to the first embodiment of the present invention.
Figure 4B:
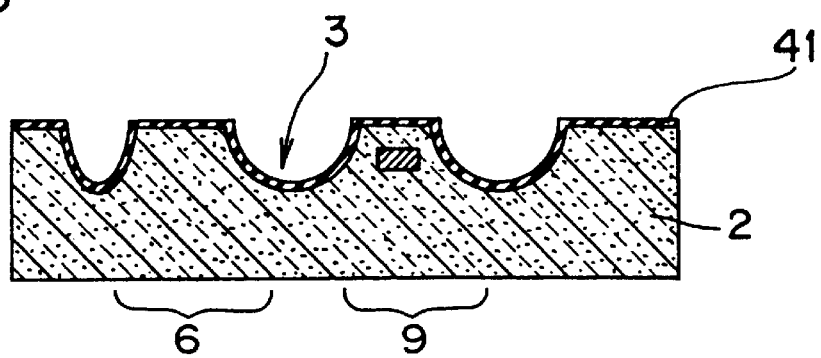
Figure 4C:
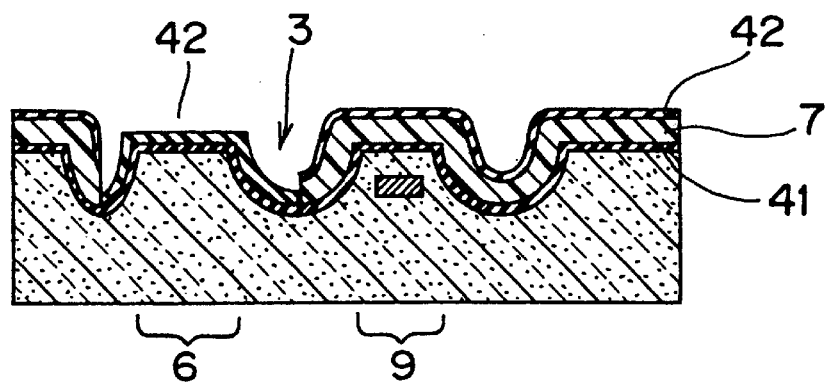
Figure 4D:
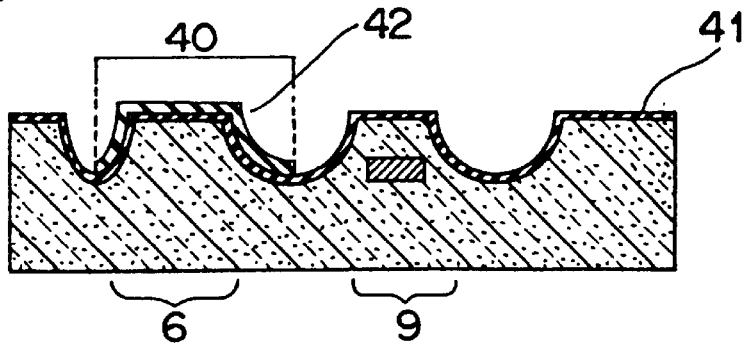

A further modified method of manufacturing the light modulator 50 of the present will now be described with reference to FIGS. 4A to 4D. At the outset, as shown in FIG. 4A, after a predetermined crystalline layer has been epitaxially grown on the InP semiconductor substrate 2, a pair of grooves 3 are formed at a predetermined location in the semiconductor substrate 2 so that the mesa section 9 of a predetermined width having the light absorption layer 1 can be eventually formed between these grooves 3. The generally U-shaped groove 3a continued to one of the grooves 3 is also formed to define the bonding pad forming section 6. Then, as shown in FIG. 4B, a SiO$_2$ insulating film 41 having a thickness of about 4000 Å is formed on the semiconductor substrate 2 so as to overlay the mesa section 9 and the bonding pad forming section 6 continuously. Thereafter, as shown in FIG. 4C, only a portion of the insulating film 41 other than that overlaying the bonding pad forming section 6, for example, only a portion of the insulating film 41 overlaying the mesa section 9 is covered by a photo-resist 7 that is utilized as a mask, followed by deposition of a SiO$_2$ insulating film 42 of about 4000 Å in thickness so as to continuously cover the mesa section 9 and the bonding pad forming section 6. Accordingly, the insulating film 42 is in part formed over the mask 7 and the bonding pad forming section 6 is covered by not only the insulating film 41, but also the insulating film 42 overlaying the insulating film 41. Subsequent removal of the photo-resist 7 is accompanied by removal of that portion of the insulating film 42 overlaying the photo-resist 7, allowing that portion of the insulating film 41 overlaying the mesa section 9 to be exposed to the outside. Consequently, as shown in FIG. 4D, the insulating layer continuously overlaying the mesa section 9 and the bonding pad forming section 6 can be obtained. Since that portion of the insulating film 41 overlaying the bonding pad forming section 6 is laminated with a corresponding portion of the insulating film 42, that portion of the insulating layer above the bonding pad forming section 6 has a thickness of about 8000 Å (the insulating thick-layer 40), but the remaining portion of the insulating layer other than that over the bonding pad forming section 6, for example, that overlaying the mesa section has a film thickness of about 4000 Å (the insulating film 41).

Thus, the bonding pad electrode 6a and the electrode 2 are formed immediately above the bonding pad forming section 6 and the mesa section 2, respectively. More specifically, while the opening is formed in the portion of the insulating layer overlaying an upper surface of the mesa section and the metallic layer connected in part with the upper surface of the mesa section through the opening and in part overlaying the bonding pad forming section. The rear surface electrode 10 is formed in any known manner as shown in FIG. 1A, thereby completing the light modulator 50 of the present invention.

Since as discussed above the insulating thick-layer 40 is formed only immediately below the bonding pad electrode 6a, the parasitic static capacitance between the bonding pad electrode 6a and the rear surface electrode 10 can be reduced. Also, since the insulating thick-layer 40 is formed on that relatively narrow portion of the bonding pad forming section 6, there is no possibility that the substrate 2 may warp. Furthermore, since that portion of the insulating film 42 overlaying the mesa section 9 has a relatively small thickness as is the case with that in the conventional light modulator, there is no difficulty forming the opening in the insulating layer.

It is to be noted in any one of the foregoing methods, the insulating layer 40 has been described as made of $SiO_2$, the present invention can be equally applied where SiN or any other insulating layer is employed therefor.

Also, formation of the insulating layer may be carried out any known method such as, for example, by the use of the CVD, sputtering or vacuum evaporation technique.

Second Embodiment

Figure 5A:
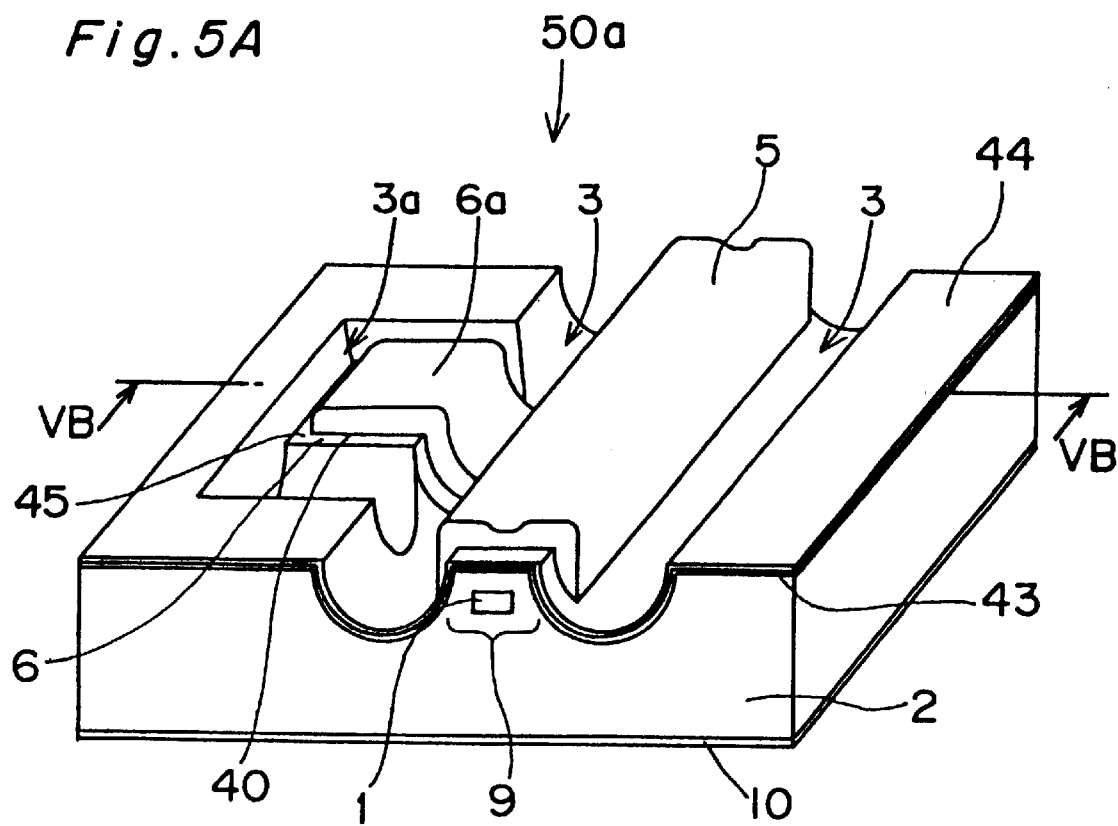
FIG. 5A is a fragmentary perspective view of a light modulator according to a second preferred embodiment of the present invention.
Figure 5B:
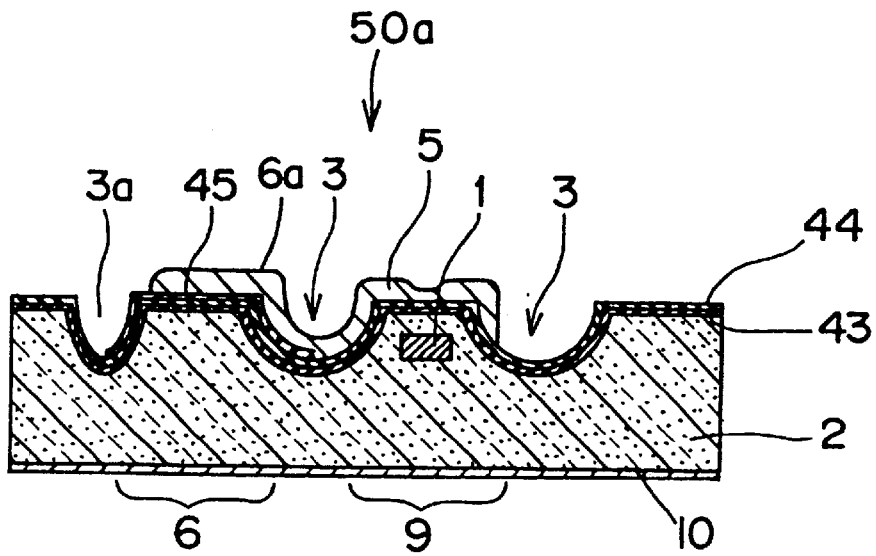
FIG. 5B is a cross-sectional view taken along the line VB—VB in FIG. 5A.

The light modulator 50a according to a second preferred embodiment of the present invention is shown in FIGS. 5A and 5B. In this embodiment, the light modulator 50a includes, as shown in FIG. 5A, a mesa section 9 and a bonding pad forming section 6 both protruding outwardly from an InP semiconductor substrate 2. More specifically, the mesa section 9 is delimited by and between a pair of parallel grooves 3 formed at a predetermined position in the semiconductor substrate 2. The bonding pad forming section 6 is positioned on one side of one of the grooves 3 opposite to the mesa section 9 and is delimited by such one of the grooves 3 and a generally U-shaped groove 3a defined in the semiconductor substrate 2. The mesa section 9 includes an electrode 5 formed thereon through a $SiO_2$ insulating film 44 and has a light absorption layer 1 embedded therein, which layer 1 is operable to receive and transmit a laser beam therethrough. On the other hand, the bonding pad forming section 6 includes a bonding pad electrode 6a formed thereon through a $SiO_2$ insulating film 45 intervening between it and the bonding pad electrode 6a. The bonding pad electrode 6a and the electrode 5 form and are served respectively by different parts of a metallic layer. It is to be noted that the light modulator 50 has a rear surface formed with a rear surface electrode 10.

In the illustrated light modulator 50a, as shown in FIG. 5B, a double layered structure including a $SiO_2$ insulating film 43 and a SiN insulating film 44 is formed on the semiconductor substrate 2 so as to continuously cover the mesa section 9, the bonding pad forming section 6 and the generally U-shaped groove 3a. The $SiO_2$ insulating film 45 referred to above is formed over a portion of the SiN insulating film 44 overlaying the bonding pad forming section 6. In other words, the bonding pad forming section 6 is covered by an insulating thick-film of a three layered structure including respective portions of the insulating films 43, 44 and 45. A metallic layer is formed over the insulating film 4 and the insulating thick-film so that a portion of the metallic layer overlaying the bonding pad forming section and another portion of the metallic layer overlaying the mesa section 9 form the bonding electrode 6a and the electrode 5, respectively. The electrode 5 is held in contact with the mesa section 4 through an opening formed above an upper surface of the mesa section 4.

Since the insulating thick-film is formed only immediately below the bonding pad electrode 6a, the parasitic static capacitance between the bonding pad electrode 6a and the rear surface electrode 10 can be reduced. In detail, by increasing the thickness of thick-layer 40 around the bonding pad forming section 6 from 4000 Å to 8000 Å, the parasitic static capacitance around the bonding pad forming section 6 is half of the parasitic static capacitance around the mesa section 9.Becase the capacitance is inverse proportion to the thickness of the insulating layer. Also, since the insulating thick-film 40 is formed on a relatively narrow portion of the bonding pad forming section 6, there is no possibility that the substrate 2 may warp. Furthermore, since that portion of the insulating layer overlaying the mesa section 9 has a relatively small thickness as is the case with that in the conventional light modulator, there is no difficulty forming the opening in the insulating layer.

Figure 6A:
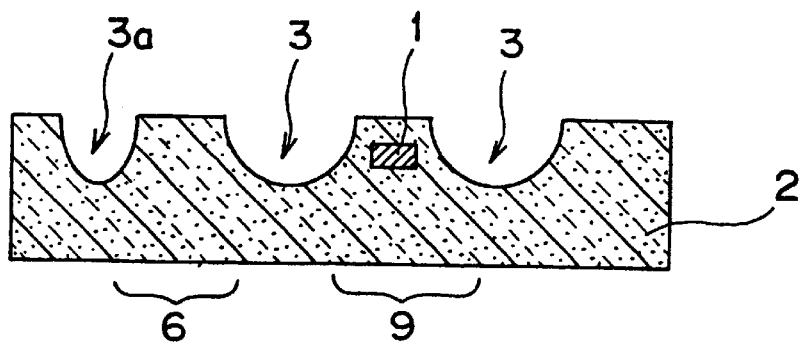
FIGS. 6A to 6D are respective views similar to FIG. 5B, showing the method of manufacture of the light modulator according to the second embodiment of the present invention.
Figure 6B:
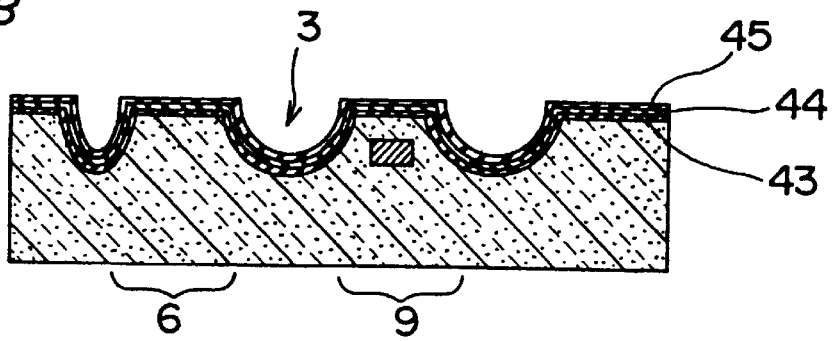
Figure 6C:
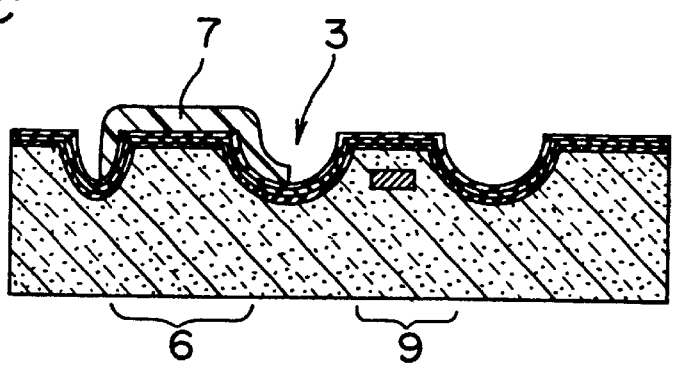

The light modulator 50a according to the second embodiment of the present invention can be manufactured by the following method which will be described with particular reference to FIGS. 6A to 6D. At the outset, as shown in FIG. 6A, after a predetermined crystalline layer has been epitaxially grown on the InP semiconductor substrate 2, a pair of grooves 3 are formed at a predetermined location in the semiconductor substrate 2 so that the mesa section 9 of a predetermined width having the light absorption layer 1 can be eventually formed between these grooves 3. The generally U-shaped groove 3a continued to one of the grooves 3 is also formed to define the bonding pad forming section 6. Then, as shown in FIG. 6B, a $SiO_2$ insulating film 43 of 2000 Å in thickness, a SiN insulating film 44 of 2000 Å in thickness and a $SiO_2$ insulating film 45 of 4000 Å in thickness are successively formed on the semiconductor substrate 2 so as to cover the mesa section 9 and the bonding pad forming section 6 continuously. Thereafter, as shown in FIG. 6C, only the bonding pad forming section 6 is covered by a photo-resist 7 that is utilized as a mask, followed by removal by etching of a portion of the outermost insulating film 45 overlaying the substrate 2, for example, the mesa section 9 and the grooves 3, other than the bonding pad forming section.

Figure 6D:
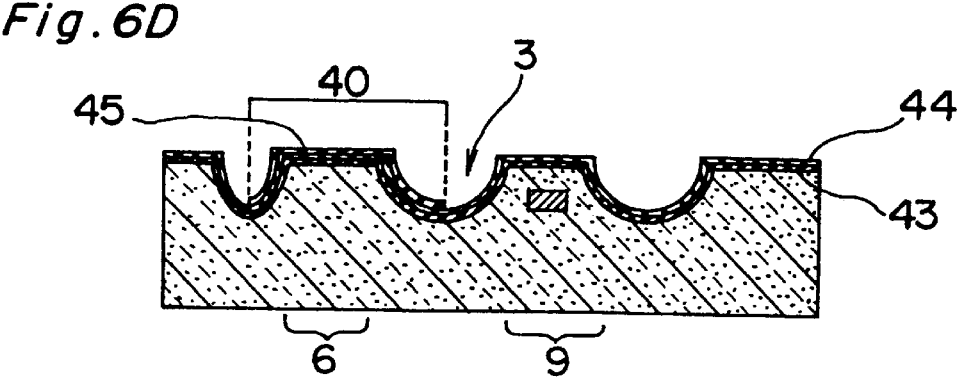
Figure 7:
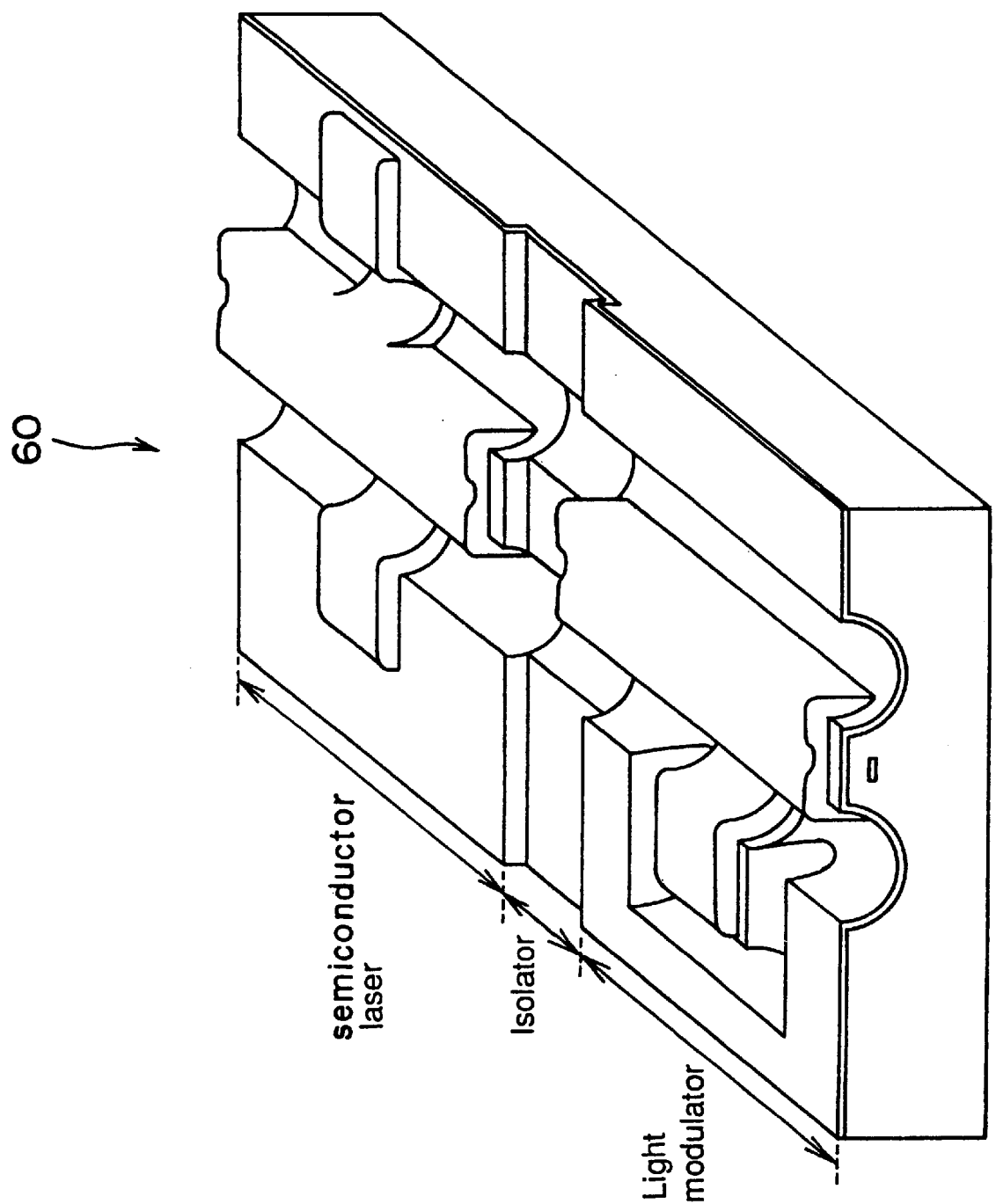
FIG. 7 is a perspective view of the prior art combined modulator and laser assembly.
Figure 8A:
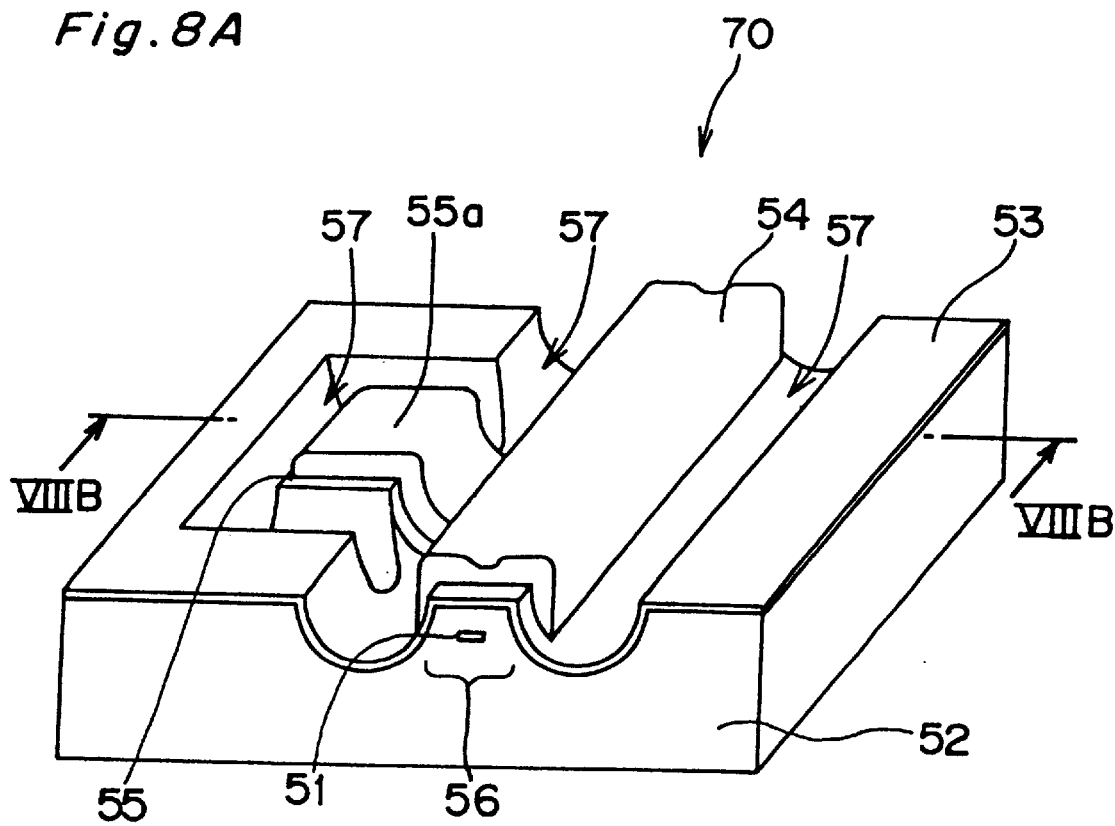
FIG. 8A is a perspective view of the prior art modulator.
Figure 8B:
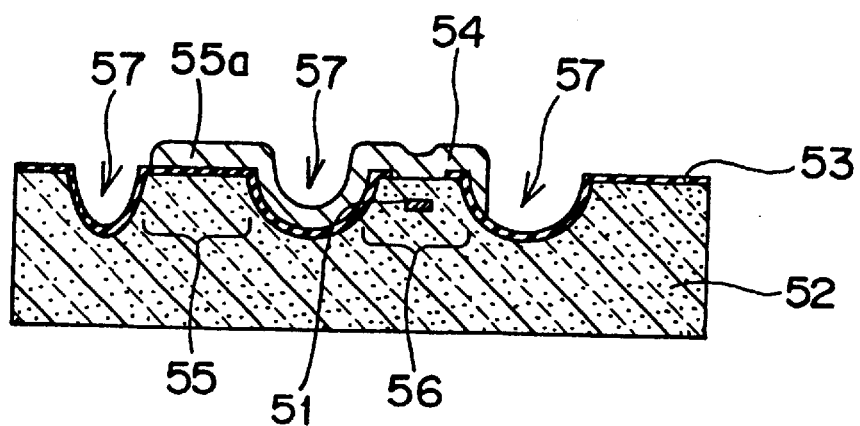
FIG. 8B is a cross-sectional view taken along the line VIIIB—VIIIB in FIG. 8A.
Figure 9A:
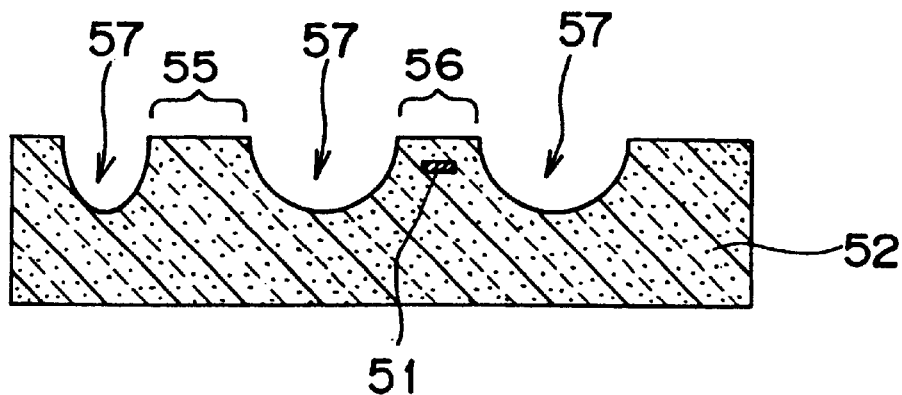
FIGS. 9A to 9C are view similar to FIG. 8B, showing the prior art method of manufacturing the prior art light modulator.
Figure 9B:
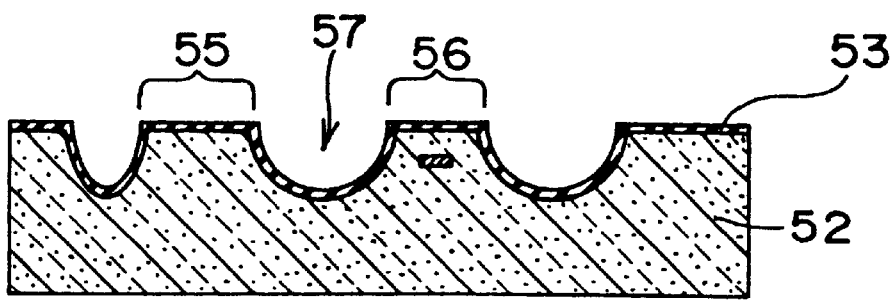
Figure 9C:
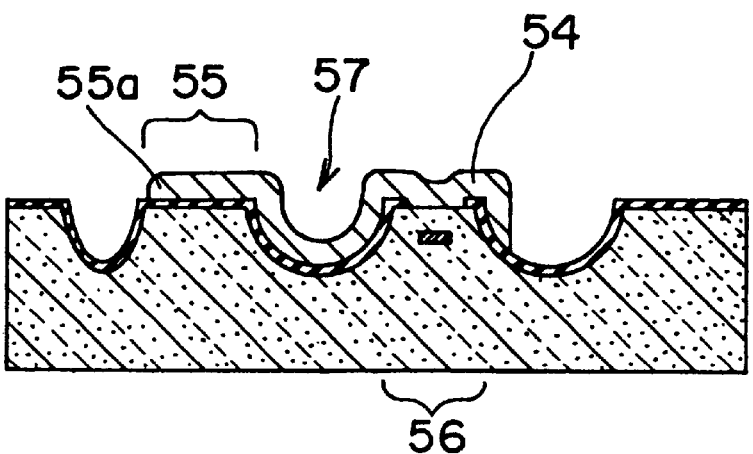

Since the insulating film 45 so removed is made of $SiO_2$ and the insulating film 44 beneath the insulating film 45 is made of SiN, the use of an etching solution capable of selectively etching $SiO_2$ only while the insulating film 44 in the form of the SiN film serves as an etching stopper layer is effective to controllably remove only the outermost $SiO_2$ film. For example, the etching soluitin is a hydrofluoric acid, because the etching rate for $SiO_2$ is as 3–5 times as for SiN. After the subsequent removal of the photo-resist 7, as shown in FIG. 6D, the insulating thick-film, about 8000 Å in thickness, of the three layered structure including the insulating films 43, 44 and 45 are formed only over the bonding pad forming section 6, while the other area, for example, the mesa section 9 and the grooves 3 are covered by the insulating film, about 4000 Å in thickness, of the double layered structure including the insulating layers 43 and 44.

Thus, the bonding pad electrode 6a and the electrode 2 are formed immediately above the bonding pad forming section 6 and the mesa section 2, respectively. More specifically, while the opening is formed in the portion of the insulating layer overlaying an upper surface of the mesa section and the metallic layer connected in part with the upper surface of the mesa section through the opening and in part overlaying the bonding pad forming section. The rear surface electrode 10 is formed in any known manner as shown in FIG. 5A, thereby completing the light modulator 50 of the present invention.

It is to be noted in any one of the foregoing methods, the insulating films 43 and 45 has been described as made of $SiO_2$ and the insulating film 44 has been described as made of SiN, the present invention may not be always limited thereto and the insulating films 43 and 45 may be made of SiN and the insulating film 44 maybe made of $SiO_2$. In this case, For example, the etching method is a plasma etching by $CF_4$ gas, because the etching rate for SiN is over 5 times than for $SiO_2$.

In the practice of the method of manufacturing the light modulator 50a, the insulating films or layers are preferably made by the use of any known method such as, for example, by the use of the CVD, sputtering or vacuum evaporation technique.

Since as discussed above the insulating thick-film 45 is formed only immediately below the bonding pad electrode 6a, the parasitic static capacitance between the bonding pad electrode 6a and the rear surface electrode 10 can be reduced. Also, since the insulating thick-layer 40 is formed on that relatively narrow portion of the bonding pad forming section 6, there is no possibility that the substrate 2 may warp. Furthermore, since that portion of the insulating layer overlaying the mesa section 9 has a relatively small thickness as is the case with that in the conventional light modulator, there is no difficulty forming the opening in the insulating layer.

Thus, in the light modulator of the present invention, that portion of the insulating layer immediately below the bonding pad electrode has a thickness greater than the remaining portion thereof to reduce the parasitic static capacitance of the bonding pad electrode. Accordingly, the light modulator so manufactured can be used for a high-speed modulation.

The parasitic static capacitance of the bonding pad electrode can effectively be reduced as a result that that portion of the insulating layer immediately below the bonding pad electrode is made of $SiO_2$ or SiN. Accordingly, the light modulator so manufactured can be used for a high-speed modulation.

Since the light modulator of the present invention is such that the laminated structure of two or more insulating films is formed immediately below the bonding pad electrode, the selective etching method for forming the insulating layer immediately below the bonding pad electrode is effective to controllably form the insulating layer to a desired thickness.

According to the method of manufacturing the light modulator of the present invention, after the primary insulating film continuously covering the mesa section and the bonding pad forming section has been formed, a portion of the primary insulating film other than that covering the bonding pad forming section is removed, followed by formation of a secondary insulating film continuously covering the mesa section and the bonding pad forming section. In this way, the insulating layer having a great thickness can be formed immediately below the bonding pad electrode.

Also, according to the method of manufacturing the light modulator of the present invention, after the primary insulating film continuously covering the mesa section and the bonding pad forming section has been formed, a mask is formed on a portion other than the bonding pad forming section, followed by formation of a secondary insulating film before the removal of the mask. In this way, the insulating layer is formed in two stages only over the bonding pad section. In this way, the insulating layer having a great thickness can be formed immediately below the bonding pad electrode.

Furthermore, according to the method of manufacturing the light modulator of the present invention, after the primary insulating film continuously covering the mesa section and the bonding pad forming section has been formed, a mask is formed on the bonding pad forming section, followed by etching of a portion of the insulating film other than the bonding pad forming section to a predetermined film thickness. In this way, the insulating layer is formed in two stages only over the bonding pad section. In this way, the insulating layer having a great thickness can be formed immediately below the bonding pad electrode at one step, not two step. Yet, according to the method of manufacturing the light modulator of the present invention, the selective etching technique is used to etch the primary insulating film covering the mesa section and the bonding pad forming section continuously. By this reason, the film thickness of the insulating film can be accurately controlled.

In the practice of the method of manufacturing the light modulator of the present invention, the insulating film or films are made of $SiO_2$ or SiN and, accordingly the parasitic static capacitance of the light modulator can effectively be reduced.

Also, in the practice of the method of manufacturing the light modulator of the present invention, the insulating film or films are made of $SiO_2$ and SiN and, accordingly the parasitic static capacitance of the light modulator can effectively be reduced.

The use of the CVD, sputtering or vacuum evaporation technique to form the insulating film or films is effective to facilitate formation of the insulating film or films.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A light modulator comprising;
   a semiconductor substrate having a main surface, a rear surface, and a grounding conductor on the rear surface;
   a wave guide section having a width and located on said semiconductor substrate;
   a bonding pad section on said semiconductor substrate at a location adjacent said wave guide section;
   an insulating layer covering the main surface of said semiconductor substrate, a portion of said insulating layer immediately opposite said bonding pad section comprising a multiple layer structure including insulating films; and
   an electrode opposite said bonding pad section and electrically connected to said wave guide section.

2. The light modulator according to claim 1, wherein said insulating films include an insulating film of silicon oxide and an insulating film of silicon nitride.

3. The light modulator according to claim 1, wherein one of said insulating films is selected from the group consisting of an insulating film of silicon oxide and an insulating film of silicon nitride.

4. The light modulator according to claim 1, wherein said wave guide section includes a light absorption layer and a stripe portion on said light absorption layer, said stripe portion having the width.

5. A light modulator comprising:
- a semiconductor substrate having a main surface, a rear surface, and a grounding conductor on the rear surface;
- a wave guide section having a width and located on said semiconductor substrate;
- a bonding pad section on said semiconductor substrate at a location adjacent said wave guide section;
- an insulating layer covering the main surface of said semiconductor substrate, said insulating layer having first and second portions,
- said first portion of said insulating layer being immediately opposite said bonding pad section, and comprising a multiple layer structure including a plurality of insulating films, and having a first thickness, and
- said second portion of said insulating layer having a second thickness smaller than the first thickness; and
- an electrode opposite said bonding pad section and electrically connected to said wave guide section.

6. The light modulator according to claim 5, wherein one of said insulating films is selected from the group consisting of an insulating film of silicon oxide and an insulating film of silicon nitride.

7. The light modulator according to claim 5, wherein said insulating films include an insulating film of silicon oxide and an insulating film of silicon nitride.

8. The light modulator according to claim 5, wherein said wave guide section includes a light absorption layer and a stripe portion on said light absorption layer, said stripe portion having the width.

9. A light modulator comprising:
- a semiconductor substrate having a main surface, a rear surface, and a grounding conductor on the rear surface;
- a wave guide section having a width and located on said semiconductor substrate,
- a bonding pad section on said semiconductor substrate at a location adjacent said wave guide section;
- an insulating layer covering the main surface of said semiconductor substrate, said insulating layer having first and second portions, said first portion of said insulating layer being immediately opposite said bonding pad section and having a first thickness, said second portion of said insulating layer having a second thickness, smaller than the first thickness, said first and second portions consisting of the same material; and
- an electrode opposite said bonding section and electrically connected to said wave guide section.

10. The light modulator according to claim 9, wherein said first and second portions of said insulating layer are selected from the group consisting of silicon oxide and silicon nitride.

11. The light modulator according to claim 9, wherein said wave guide section includes a light absorption layer and a stripe portion on said light absorption layer, said stripe portion having the width.

* * * * *